US00RE42534E

(19) United States
(12) Reissued Patent
Sfarti

(10) Patent Number: US RE42,534 E
(45) Date of Reissued Patent: Jul. 12, 2011

(54) BICUBIC SURFACE REAL-TIME TESSELATION UNIT

(76) Inventor: Adrian Sfarti, Cupertino, CA (US)

( * ) Notice: This patent is subject to a terminal disclaimer.

(21) Appl. No.: 12/767,997

(22) Filed: Apr. 27, 2010

Related U.S. Patent Documents

Reissue of:
(64) Patent No.: 7,532,213
Issued: May 12, 2009
Appl. No.: 11/778,515
Filed: Jul. 16, 2007

U.S. Applications:
(63) Continuation of application No. 10/732,398, filed on Dec. 9, 2003, now Pat. No. 7,245,299, which is a continuation-in-part of application No. 10/436,698, filed on May 12, 2003, now abandoned, which is a continuation-in-part of application No. 09/734,438, filed on Dec. 11, 2000, now Pat. No. 6,563,501.

(60) Provisional application No. 60/222,105, filed on Jul. 28, 2000.

(51) Int. Cl.
*G06T 15/30* (2006.01)

(52) U.S. Cl. ..... 345/423

(58) Field of Classification Search ..... None
See application file for complete search history.

(56) References Cited

U.S. PATENT DOCUMENTS 5,125,073 A * 6/1992 Lien et al. ..... 345/442
5,261,029 A 11/1993 Abi-Ezzi et al.
5,377,320 A * 12/1994 Abi-Ezzi et al. ..... 345/502
5,428,718 A 6/1995 Peterson et al.
5,488,684 A 1/1996 Gharachorloo et al.
5,561,754 A * 10/1996 Oliver et al. ..... 345/441
5,771,341 A 6/1998 Huddy
5,903,273 A 5/1999 Mochizuki et al.
6,057,848 A * 5/2000 Goel ..... 345/423
6,100,894 A 8/2000 Goel
6,211,883 B1 * 4/2001 Goel ..... 345/423
6,256,038 B1 7/2001 Krishnamurthy
6,437,795 B1 8/2002 Brown
6,563,501 B2 5/2003 Sfarti (Continued)

FOREIGN PATENT DOCUMENTS

WO WO 00/31690 6/2000

OTHER PUBLICATIONS

Kumar, S., Manocha, D., Interactive Display of Large NURBS Models, Dec. 1996, IEEE Transactions on Visualization and Computer Graphics, vol. 2, No. 4, pp. 323-336.*

(Continued)

*Primary Examiner* — Said Broome
(74) *Attorney, Agent, or Firm* — Edward P. Heller, III

(57) ABSTRACT

The present invention provides a graphics processing unit for rendering objects from a software application executing on a processing unit in which the objects to be rendered are received as control points of bicubic surfaces. According to the method and system disclosed herein, the graphics processing unit includes a transform unit, a lighting unit, a renderer unit, and a tessellate unit for tessellating both rational and non-rational object surfaces in real-time.

20 Claims, 14 Drawing Sheets

U.S. PATENT DOCUMENTS

| | | | | |
|---|---|---|---|---|
| 6,597,356 | B1 * | 7/2003 | Moreton et al. | 345/423 |
| 6,600,488 | B1 | 7/2003 | Moreton et al. | |
| 6,624,811 | B1 * | 9/2003 | Moreton et al. | 345/423 |
| 6,906,716 | B2 * | 6/2005 | Moreton et al. | 345/423 |
| 2003/0117405 | A1 * | 6/2003 | Hubrecht et al. | 345/543 |
| 2004/0113909 | A1 * | 6/2004 | Fenney et al. | 345/419 |
| 2004/0227755 | A1 | 11/2004 | Sfarti | |
| 2005/0057568 | A1 | 3/2005 | Sfarti | |
| 2006/0125824 | A1 | 6/2006 | Sfarti | |

OTHER PUBLICATIONS

Snyder, J., Barr, A., Ray Tracing Complex Models Containing Surface Tesselations, Jul. 1987, Proceedings of the 14th annual conference on Computer graphics and interactive techniques, vol. 21, No. 4, p. 119-128.*

Jeffrey M. Lane, et al, "Scan Line Methods for Displaying Parametrically Defined Surfaces", Jan. 1980, Communications of the ACM, vol. 23, No. 1, pp. 23-24.

Xuejun Sheng and Ingo R. Meier, "Generating Topological Structures for Surface Models", Nov. 1995, IEEE Computer Graphics and Applications, vol. 15, No. 6, pp. 35-41.

Jatin Chhugani and Subodh Kumar, "View-Dependent Adaptive Tesselation of Spline Surfaces", Mar. 2001, Proceedings of The 2001 Symposium On Interactive 3D Graphics, pp. 59-62.

P.V. Sander, et al., "Multi-Chart Geometry Images", Jun. 2003, Proceedings of the 2003 Eurographics Symposium on Geometry Processing, pp. 146-155.

Alyn Rockwood, et al., "Real-Time Rendering of Trimmed Surfaces", Jul. 1989, ACM Siggraph Computer Graphics, vol. 23, No. 3, pp. 107-116.

Fuhua Cheng, "Estimating Subdivision Depths for Rational Curves and Surfaces", Apr. 1992, ACM Transactions on Graphics, vol. 11, No. 2, pp. 140-151.

James Foley, et al., "Computer Graphics: Principles and Practice", 2d Edition, Addison-Wesley Publishing Company, 1990, pp. 511-527.

* cited by examiner

Vertex Normal
Triangle Normal 12
14
$v_{ij}$
$s_i$
$s_n$
$s_1$
$t_1$
$t_j$
$t_m$
12
$s_n$
$s_j$
$s_1$
$t_1$
$t_j$
$t_m$

10

"T-joint"

Figure 13

1. Strip ($S_1$, $S_2$, . . . $S_i$, . . .$S_n$)

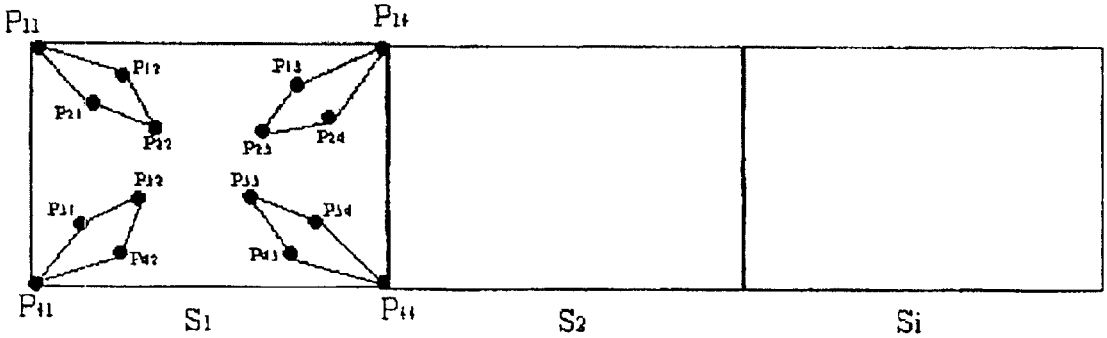

16 control points 12 control points 12 control points $S_1$ { $P_{11}$, $P_{14}$, $P_{41}$, $P_{44}$ (Color, texture, geometry)
$P_{12}$ . . . . .$P_{43}$ (Geometry)
N = outwards pointing normal $S_i$ { $\cancel{P_{11}}$, $\cancel{P_{14}}$, $\cancel{P_{41}}$, $P_{44}$
$P_{12}$. . . .$\cancel{P_{24}}$ $\cancel{P_{34}}$ . . .$P_{43}$
N

Figure 14

2. Fan ($P_{11}$, $S_1$, . . . $S_i$, . . .$S_n$)

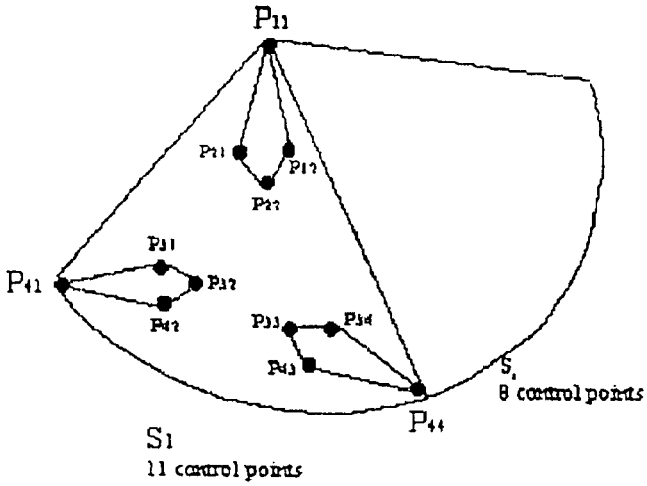

$S_1$ { $\cancel{P_{11}}$, $\cancel{P_{14}}$, $P_{41}$, $P_{44}$
$\cancel{P_{12}}$. . . $\cancel{P_{13}}$, $P_{23}$, $P_{24}$
N $S_i$ { $\cancel{P_{11}}$, $\cancel{P_{14}}$, $\cancel{P_{41}}$, $P_{44}$
$\cancel{P_{12}}$. . . $\cancel{P_{13}}$, $\cancel{P_{23}}$, $\cancel{P_{24}}$, $\cancel{P_{34}}$
N Mesh ($S_{11}$, $S_{12}$, ... $S_{1N}$, ... $S_{21}$, ... $S_{2N}$, ... $S_{M1}$, ... $S_{MN}$)

| | | | | | |
|---|---|---|---|---|---|
| $S_{M1}$ 12 Control Points | $S_{M2}$ 9 | | $S_{Mi}$ 9 | | $S_{MN}$ 9 |
| | | | | | |
| $S_{21}$ 12 Control Points | $S_{22}$ 9 Control Points | | $S_{2i}$ 9 | | $S_{2N}$ 9 |
| $S_{11}$ 12 Control Points | $S_{12}$ 12 Control Points | | $S_{1i}$ 9 | | $S_{1N}$ 12 |

Figure15

BICUBIC SURFACE REAL-TIME TESSELATION UNIT

Matter enclosed in heavy brackets [ ] appears in the original patent but forms no part of this reissue specification; matter printed in italics indicates the additions made by reissue.

CROSS-REFERENCE TO RELATED APPLICATIONS

The present invention is a continuation of U.S. application Ser. No. 10/732,398, now U.S. Pat. No. 7,245,299, entitled "Bicubic Surface Real-Time Tesselation Unit", (1935CIP2) filed Dec. 9, 2003, issued on Jul. 17, 2007, which is a continuation-in-part of abandoned U.S. application Ser. No. 10/436,698, entitled "Bicubic Surface Rendering," (1935CIP) filed on May 12, 2003, which is a continuation-in-part of Ser. No. 09/734,438 filed Dec. 11, 2000, now U.S. Pat. No. 6,563,501 entitled "Bicubic Surface Rendering," issued May 13, 2003, which claims priority of provisional application No. 60/222,105, filed on Jul. 28, 2000, which are hereby incorporated by reference.

FIELD OF THE INVENTION

The present invention relates to computer graphics, and more specifically to a method and apparatus for rendering bicubic surfaces in real-time on a computer system.

BACKGROUND OF THE INVENTION

Object models are often stored in computer systems in the form of surfaces. The process of displaying the object (corresponding to the object model) generally requires rendering, which usually refers to mapping the object model onto a two dimensional surface. At least when the surfaces are curved, the surfaces are generally subdivided or decomposed into triangles in the process of rendering the images.

A cubic parametric curve is defined by the positions and tangents at the curve's end points. A Bezier curve, as shown in FIG. 5 for example, is defined by a geometry matrix of four points (P1-P4) that are defined by the intersections of the tangent vectors at the end points of the curve. Changing the locations of the points changes the shape of the curve.

Cubic curves may be generalized to bicubic surfaces by defining cubic equations of two parameters, s and t. In other words, bicubic surfaces are defined as parametric surfaces where the (x,y,z) coordinates in a space called "world coordinates" (WC) of each point of the surface are functions of s and t, defined by a geometry matrix P comprising 16 control points (FIG. 5).

While the parameters s and t describe a closed unidimensional interval (typically the interval [0,1]) the points (x,y,z) describe the surface:

$x=f(s,t)$, $y=g(s,t)$, $z=h(s,t)$ $s\epsilon[0,1]$, $t.\epsilon[0,1]$, where $\epsilon$ represents an interval between the two coordinates in the parenthesis.

The space determined by s and t, the bidimensional interval $[0,1]\times[0,1]$ is called "parameter coordinates" (PC). Textures described in a space called "texture coordinates" (TC) that can be two or even three dimensional are described by sets of points of two ((u,v)) or three coordinates ((u,v,q)). The process of attaching a texture to a surface is called "texture—object association" and consists of associating u, v and q with the parameters s and t via some function:

$$u=a(s,t)\ v=b(s,t)\ (\text{and } q=c(s,t))$$

FIGS. 1A and 1B are diagrams illustrating a process for rendering bicubic surfaces. As shown in FIG. 1A, the principle used for rendering such a curved surface 10 is to subdivide it into smaller four sided surfaces or tiles 12 by subdividing the intervals that define the parameters s and t. The subdivision continues until the surfaces resulting from subdivision have a curvature, measured in WC space that is below a predetermined threshold. The subdivision of the intervals defining s and t produces a set of numbers {si} where the indexes i and j represent the number of rows and colomns in the resulting subdivision, i=1,n and {tj} j=1,m that determine a subdivision of the PC. This subdivision induces a subdivision of the TC, for each pair of parameters (si,tj) we obtain a pair ($u_{i,j}$, $v_{i,j}$) (or a triplet ($u_{i,j}$, $v_{i,j}$, $q_{i,j}$)). Here ui,j=a(si,tj), vi,j=b(si,tj), qi,j=c(si,tj) represent texture coordinates. For each pair (si,tj) we also obtain a Cartesian point (called "vertex") in WC, Vi,j (f(si,tj),g(si,tj),h(si,tj)). A special type of texture, called displacement map having the pair (p,r) as coordinates can be used to generate special lighting effects. For each pair of parameters (si,tj) we also obtain an index pair (pi,j ri,j) that index a displacement value (dxi,j, dyi,j, dzi,j). for the vertex Vi,j.

This process is executed off-line because the subdivision of the surfaces and the measurement of the resulting curvature are very time consuming. As shown in FIG. 1B, when all resulting four sided surfaces (tiles) 12 is below a certain curvature threshold, each such resultant four-sided surface 12 is then divided into two triangles 14 (because they are easily rendered by dedicated hardware) and each triangle surface gets the normal to its surface calculated and each triangle vertex also gets its normal calculated. The normals are used later on for lighting calculations.

Furthermore, each vertex or triangle plane normal needs to be transformed when the surface is transformed in response to a change of view of the surface, a computationally intensive process that may need dedicated hardware. Also, there is no accounting for the fact that the surfaces are actually rendered in a space called "screen coordinates" (SC) after a process called "projection" which distorts such surfaces to the point where we need to take into consideration the curvature in SC, not in WC.

The state of the art in today's hardware architecture for rendering relies overwhelmingly on triangle databases such as meshes, strips, fans. The current state of the art in the computer graphics industry is described in FIG. 2, which shows an architecture of a conventional computer graphics system, including the architecture of a graphics processing unit (GPU). A CPU 1, executes a software application in the form of a game play or a physical or chemical simulation, etc., in which objects to be rendered are represented as triangle meshes in an object database stored in memory. The triangle meshes are transmitted over an accelerated graphics port (AGP) bus 6 to the GPU 5, which is typically part of a display adapter (video card). The AGP bus 6 is a high-speed port that is designed for the display adapter only to provide a direct connection between the card and memory. The GPU 5 includes a transform unit 2, a lighting unit 3 and a renderer unit 4.

The object modeling in the application is executed on parametric surfaces such as nurbs, Bezier, splines, and the surfaces are subdivided or tessellated off-line and stored as triangle vertices in a triangle database by means of commercially available tools, such as the Alias suite. The triangle vertices are then transmitted from the CPU 1 (the triangle server) to the GPU 5 (the rendering engine) at the time for rendering. Previous attempts to execute the tessellation in hardware in real-time have not been successful because of the severe limitations of the implementation so the current state of the art has been off-line tessellation.

Unfortunately, the off-line tessellation produces a fixed triangulation that may exhibit an excessively large number of very small triangles when the object is far away. Triangle rendering in this case is dominated by the processing of vertices (transformation, lighting) and by the triangle setup (the calculation of the color and texture gradients). Since triangles may reduce to a pixel or less, it is obvious that this is an inefficient treatment.

Conversely, when the object is very close to the viewer, the composing triangles may appear very large and the object looses its smoothness appearance, looking more like a polyhedron.

The increase in the scene complexity has pushed up the number of triangles, which has pushed up the demands for higher bus bandwidth. For example, the bus 6 that connects the CPU 1 with the GPU 5 has increased 8× in frequency, from AGP 1× to AGP 8× in the PC space in the last few years. There are physical constraints in terms of signal propagation that preclude the continuation of the frequency increase in bus design.

With the advent of faster arithmetic it has become possible to change the current architecture such that the CPU 1 will serve parametric patches and the renderer 5 will triangulate such patches in real-time. There are very few past attempts of implementing real-time tesselation in hardware. Sun Corporation tried in the mid-80's to implement such a machine. The implementation was based on an architecture described in a paper by Lien, Sheue-Ling, Shantz, Michael, Pratt, Vaughan "Adaptive Forward Differencing for Rendering Curves and Surfaces", Siggraph '87 Proceedings, pp. 111-118 and in a series of associated patents. The implementation was not a technical and commercial success because it made no good use of triangle based rendering, trying instead to render the surfaces pixel by pixel. The idea was to use adaptive forward differencing in interpolating infinitesimally close parallel cubic curves imbedded into the bicubic. The main drawback was that sometimes the curves were too close together, resulting into pixel overstrikes and other times the curves were too far apart, leaving gaps. Another drawback was that the method is slow.

In the early 90's Nvidia Corporation made an attempt to introduce a biquadric based hardware renderer. The attempt was not a technical and commercial success because biquadrics have an insufficient number of degrees of freedom, all the models use bicubics, none of the models uses biquadrics.

More currently, Henry Moreton from Nvidia has resurrected the real-time tesselation unit described in the U.S. Pat. No. 6,597,356 entitled "Integrated Tesselator in a Graphics Processing Unit," issued Jul. 22, 2003. Moreton's invention doesn't directly tesselate patches in real-time, but rather uses triangle meshes pre-tesselated off-line in conjunction with a proprietary stitching method that avoids cracking and popping at the seams between the triangle meshes representing surface patches. His tesselator unit outputs triangle databases to be rendered by the existing components of the 3D graphics hardware.

Accordingly, what is needed is a system and method for performing tessellation in real-time. The present invention addresses such a need.

SUMMARY OF THE INVENTION

The present invention provides a graphics processing unit for rendering objects from a software application executing on a processing unit in which the objects to be rendered are received as control points of bicubic surfaces. According to the method and system disclosed herein, the graphics processing unit includes a transform unit, a lighting unit, a renderer unit, and a tessellate unit for tessellating both rational and non-rational object surfaces in real-time.

BRIEF DESCRIPTION OF THE DRAWINGS

The present invention will be described with reference to the accompanying drawings, wherein:

FIG. 13 shows an example of a strip of surfaces.

FIG. 14 shows an example of a fan of surfaces.

FIG. 15 shows an example of a mesh of surfaces.

DESCRIPTION OF THE INVENTION

The present invention is directed to a method and apparatus for minimizing the number of computations required for the subdivision of bicubic surfaces into triangles for real-time tessellation. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Because prior art methods for performing surface subdivision are so slow and limited, a method is needed for rendering a curved surface that minimizes the number of required computations, such that the images can potentially be rendered in real-time (as opposed to off-line).

Figure 6:
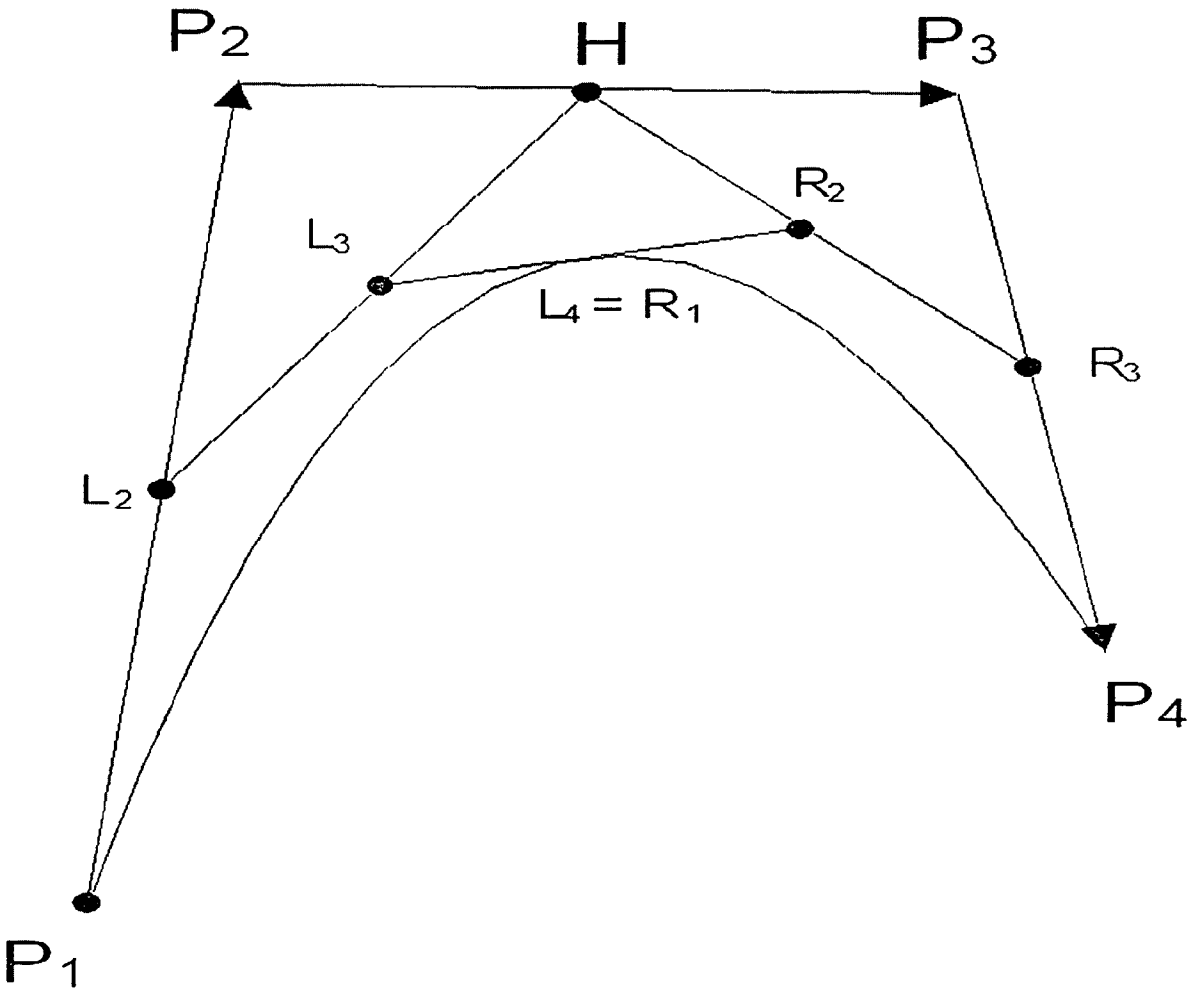
FIG. 6 describes the recursive subdivision of the convex hull of a Bezier curve.

U.S. Pat. No. 6,563,501, by the Applicant of the present application, provides an improved method and system for rendering bicubic surfaces of an object on a computer system. Each bicubic surface is defined by sixteen control points and bounded by four boundary curves, and each boundary curve is formed by boundary box of line segments formed between four of the control points. The method and system include transforming only the control points of the surface given a view of the object, rather than points across the entire bicubic surface. Next, a pair of orthogonal boundary curves to process is selected. After the boundary curves have been selected, each of the curves is iteratively subdivided, as shown in FIG. 6, wherein two new curves are generated with each subdivision. The subdivision of each of the curves is terminated when the curves satisfy a flatness threshold expressed in screen coordinates, whereby the number of computations required to render the object is minimized.

Figure 8:
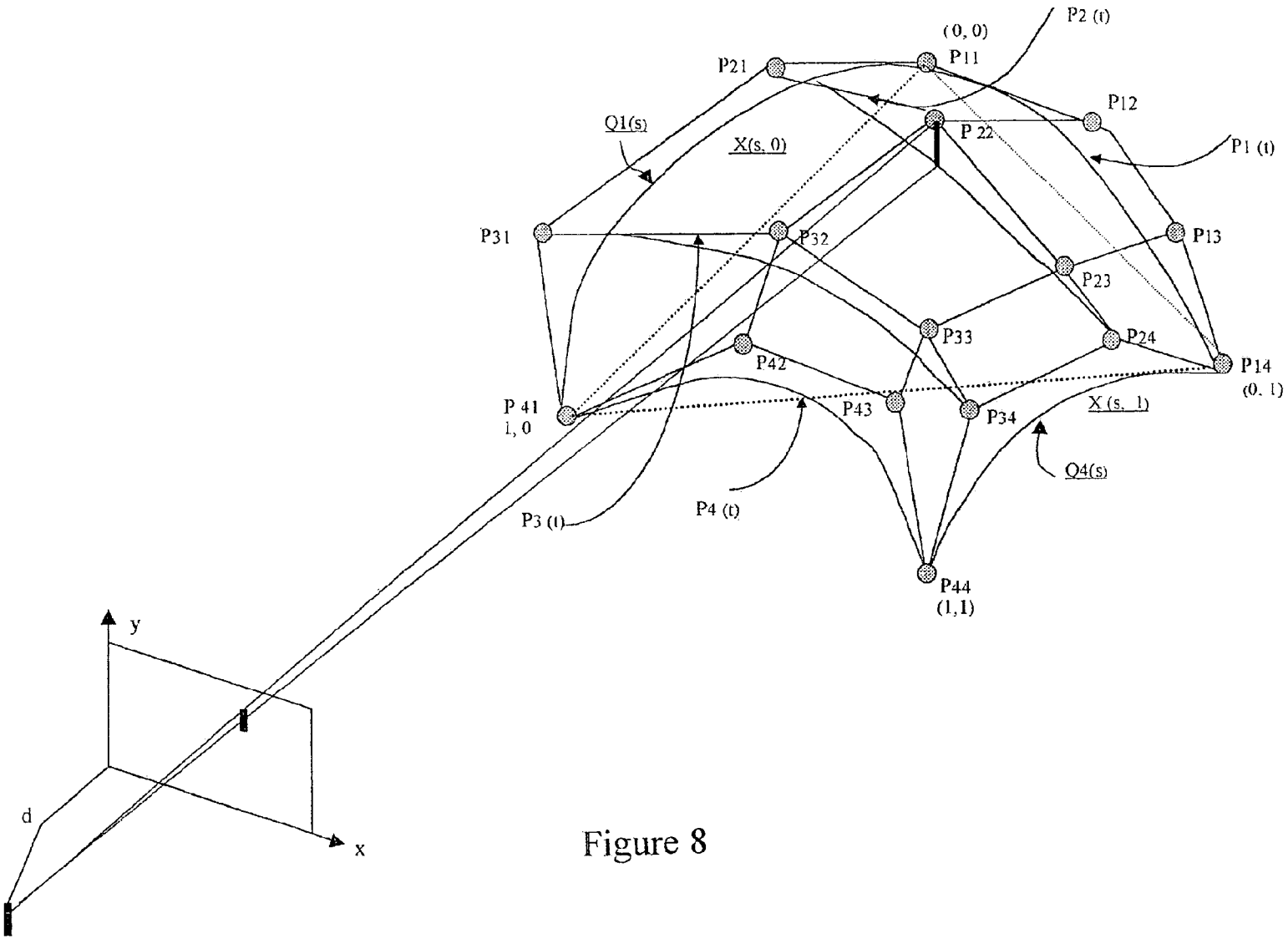
FIG. 8 illustrates the recursive subdivision of the convex hull of a bicubic surface.

The method disclosed in the '501 patent minimizes the number of computations required for rendering of an object model by requiring that only two orthogonal curves of the surface be subdivided, as shown in FIG. 8. As the number of computations is decreased, the entire rendering process can potentially be performed in real-time. In addition, the computations for subdivision are performed by expressing the criteria of terminating the subdivision in the screen coordinates (SC). As the curvature is estimated based on how flat it appears to be in SC (pixels), rather than how curved it is in WC, the number of computations required may further be minimized. As a result, the possibility of rendering images in real-time is further enhanced. In addition, allowing the curvature to be measured in SC units also allows for accommodating the distance to the viewer, thus giving the process an "automatic level of detail" capability.

The present invention utilizes the above method for minimizing the number of computations required for the subdivision of bicubic surfaces into triangles in order to provide an improved architecture for the computer graphics pipeline hardware. The improved architecture replaces triangle mesh transformation and rendering with a system that transforms bicubic patches and tesselates the patches in real-time. This process is executed in a real-time tesselation unit that replaces the conventional transformation unit present in the prior art hardware 3D architectures.

According to the present invention, the reduction in computations is attained by reducing the subdivision to the subdivision on only two orthogonal curves. In addition, the criteria for sub-division may be determined in SC. The description is provided with reference to Bezier surfaces for illustration. Due to such features, the present invention may enable objects to be subdivided and rendered in real-time. The partition into triangles may also be adapted to the distance between the surface and the viewer resulting in an optimal number of triangles. As a result, the effect of automatic level of detail may be obtained, whereby the number of resulting triangles is inversely proportional with the distance between the surface and the viewer. The normals to the resulting tiles are also generated in real-time by using the cross product of the vectors that form the edges of the tiles. The texture coordinates associated with the vertices of the resulting triangles are computed in real-time by evaluating the functions: u=a(s, t) v=b(s,t). The whole process is directly influenced by the distance between viewer and object, the SC space plays a major role in the computations.

The steps involved in the combined subdivision and rendering of bicubic surfaces in accordance with the present invention are described below in pseudo code. As will be appreciated by one of ordinary skill in the art, the text between the "/*" and "*/" symbols denote comments explaining the pseudo code. All steps are performed in real-time, and steps 0 through 4 are transformation and tessellation, while steps 5-7 are rendering.

Step 0

/* For each surface transform only 16 points instead of transforming all the vertices inside the surface. There is no need to transform the normals to the vertices since they are generated at step 4*/.

For each bicubic surface

Transform the 16 control points and the single normal that determine the surface Step 1

/* Simplify the three dimensional surface subdivision by reducing it to the subdivision of two cubic curves */.

For each bicubic surface

Subdivide the boundary curve representing s interval until the projection of the length of the height of the curve bounding box is below a certain predetermined number of pixels as measured in screen coordinates.

Subdivide the boundary curve representing t interval until the projection of the length of the height of the curve bounding box is below a certain predetermined number of pixels as measured in screen coordinates. /*Simplify the subdivision termination criteria by expressing it in screen coordinates (SC) and by measuring the curvature in pixels. For each new view, a new subdivision can be generated, producing automatic level of detail */.

Step 2

For all bicubic surfaces sharing a same parameter (either s or t) boundary Choose as the common subdivision the reunion of the subdivisions in order to prevent cracks showing along the common boundary. —OR—

Choose as the common subdivision the finest subdivision (the one with the most points inside the set)

/* Prevent cracks at the boundary between adjacent surfaces by using a common subdivision for all surfaces sharing a boundary */

Step 3

/* Generate the vertices, normals, the texture coordinates, and the displacements used for bump and displacement mapping for the present subdivision */

For each bicubic surface

For each pair (si,tj) of parameters /*All calculations employ some form of direct evaluation of the variables. Here, i and j represent a number of rows and columns, respectively */

Calculate (texture coordinates ($u_{i,j}$ $v_{i,j}$ $q_{i,j}$) and displacement cooredinates ($p_{i,j}$ $r_{i,j}$) for vertex $V_{i,j}$) thru interpolation /*texture-, displacement map and vertex coordinates as a function of (si,tj)*/

Look up vertex displacement ($dx_{i,j}$, $dy_{i,j}$, $dz_{i,j}$) corresponding to the displacement coordinates ($p_{i,j}$ $r_{i,j}$)

Generate triangles by connecting neighboring vertices.

Step 4

For each vertex $V_{i,j}$

Calculate the normal $N_{i,j}$ to that vertex /* Already transformed in WC */

Calculate ($dN_{i,j}$)/*normal displacement for bump mapping as a function of (si,tj)*/

$N'_{i,j}=N_{i,j}+dN_{i,j}$/*displace the normal for bump mapping*/

$V'_{i,j}=V_{i,j}+(dx_{i,j}, dy_{i,j}, dz_{i,j})*N_{i,j}$ /*displace the vertex for displacement mapping*/

/* bump and displacement mapping are executed in the renderer, pixel by pixel for all the points inside each triangle */

For each triangle

Calculate the normal to the triangle /*used for culling */

Step 5

For each triangle

Clip against the viewing viewport

Calculate lighting for the additional vertices produced by clipping

Cull backfacing triangles

Step 6

Project all the vertices Vi,j into screen coordinates (SC)

Step 7

Render all the triangles produced after clipping and projection

Figures 1A, 1B:
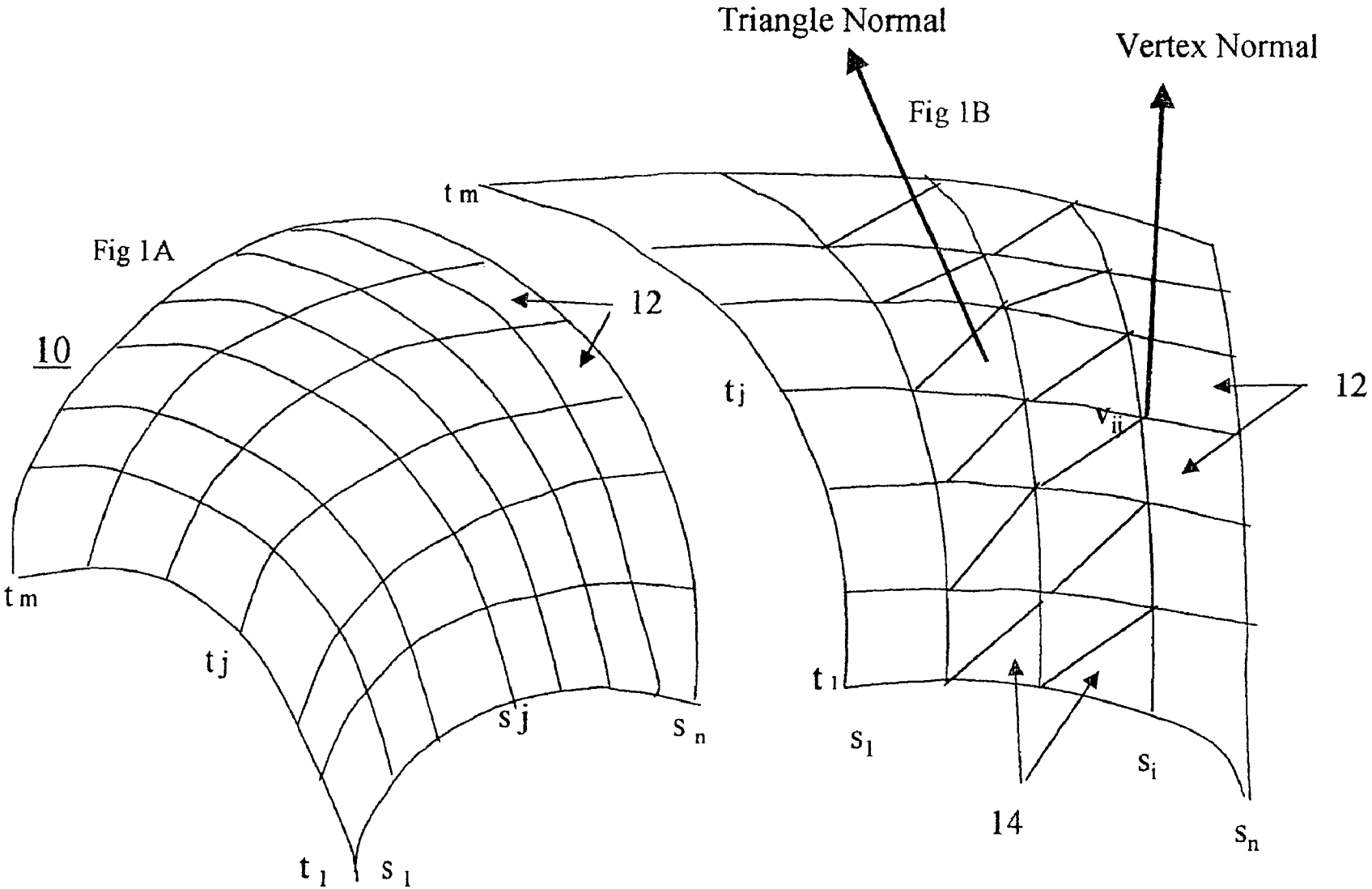
FIGS. 1A and 1B are diagrams illustrating a process for rendering bicubic surfaces.
Figure 2:
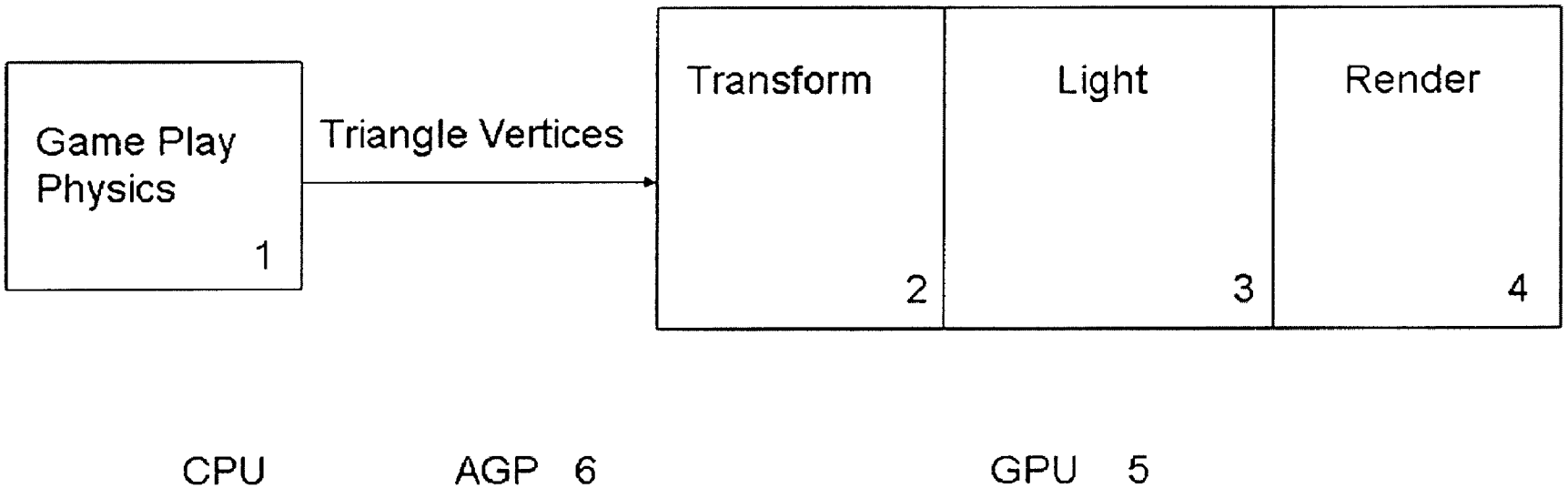
Prior Art Figure 2
FIG. 2 describes the current architecture of a computer graphics system, in specific the current architecture of a graphics processing unit (GPU).
Figure 3:
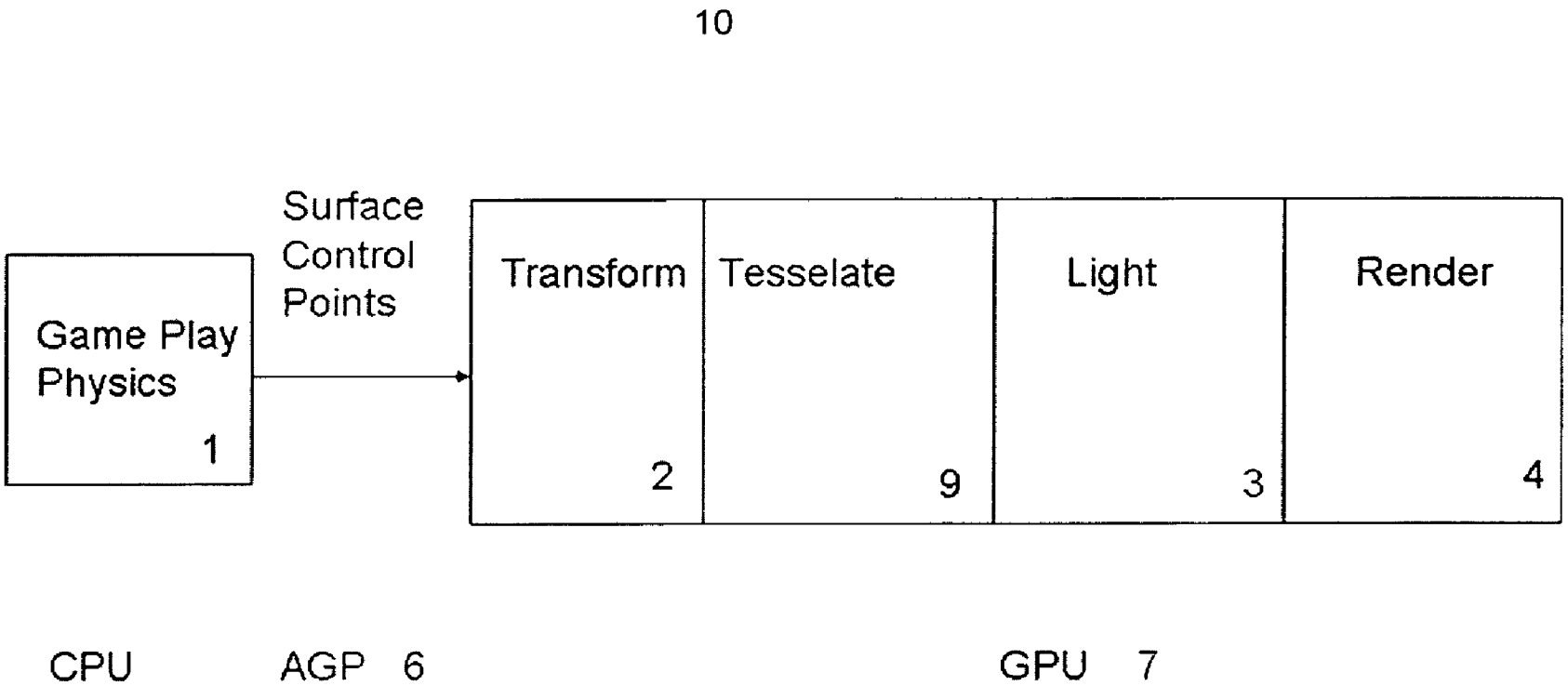
FIG. 3 describes the new architecture of a GPU that includes a Tessellator Unit inserted between the Transform Unit and the Light Unit.

Referring now to FIG. 3, a block diagram of the graphics system of the present invention is shown, where like components from FIG. 2 have like reference numerals. The present invention utilizes the above algorithm to provide an improved graphics system 10. The system 10 includes CPU 1 and GPU 7. According to the present invention, the GPU 7 includes a transform unit 2, a lighting unit 3, a renderer unit 4, and a tessellate unit 9 coupled between the transform unit 2 and the lighting unit 3 for tessellating both rational and non-rational object surfaces in real-time.

In operation, the CPU 1 executes a software application and transmits over the AGP bus 6 the object database expressed in a compressed format as control points of the bicubic surfaces. The control points of the bicubic surfaces are transformed by the transform unit 2, and then the surfaces are tessellated into triangles by the tessellate unit 9. The tessellate unit 9 executes the microcode described above in the Step 1 through Step 4, thereby affecting the real-time tessellation. The vertices of the triangles are then lit by the lighting unit 3 and the triangles are rendered by the renderer unit 4 executing steps 5 through 7.

Figure 4:
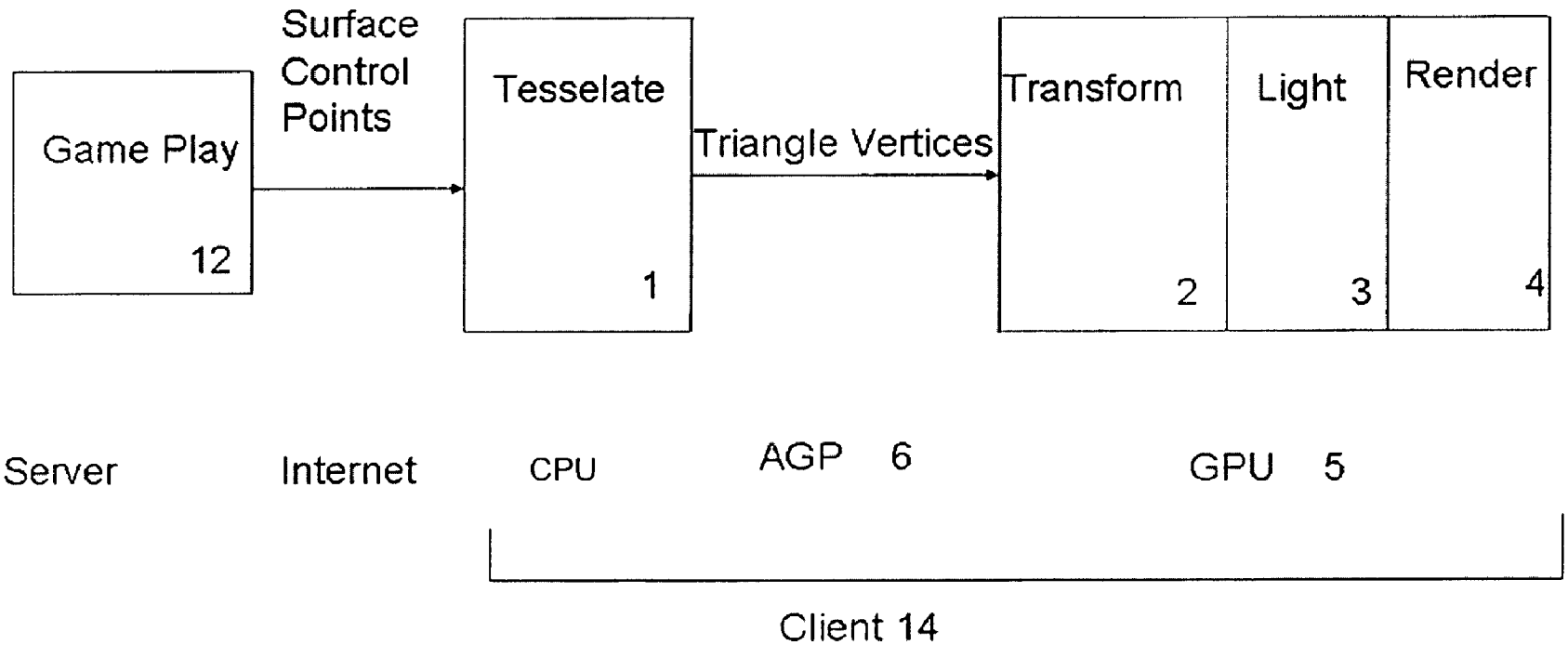
FIG. 4 describes the architecture of an internet system employing multiple CPU's at the receiving end performing real-time tessellation.
Figure 5:
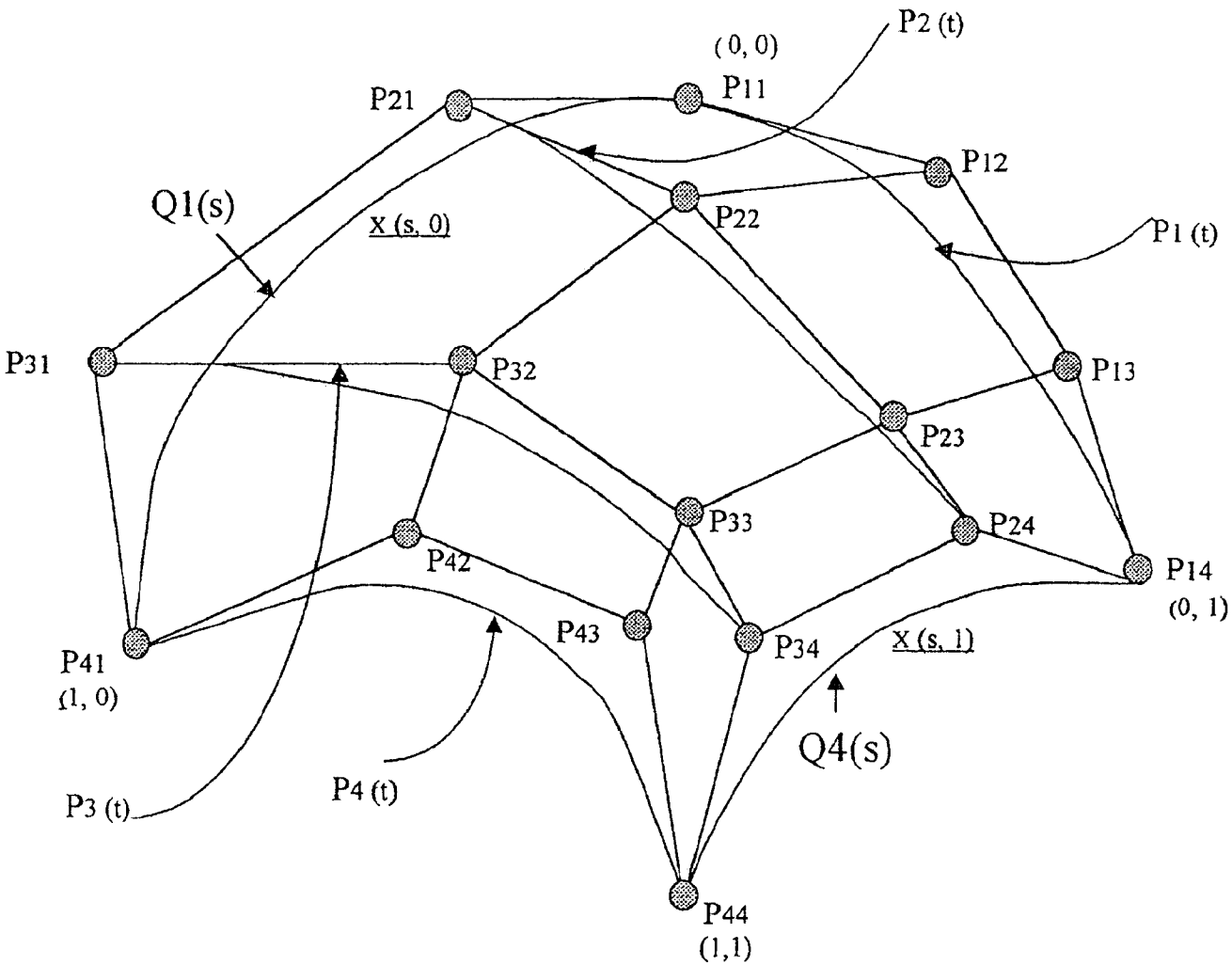
FIG. 5 illustrates a bicubic surface.

FIG. 4 is a diagram illustrating architecture of a network-based graphics system targeting for performing real-time tessellation for online gaming according to a second preferred embodiment of the present invention. This second embodiment targets the interactive multi-player game play over a network, such as the Internet in which multiple client computers 14 comprising a CPU 1 and GPU 5 are in communication with a server 12. The server 12 sends object databases over the Internet in the form of control points for bicubic patches to the CPUs 1 for tessellation of the databases into triangles. The CPUs 1 then transfer the triangles to conventional GPU's 5 comprising transform units 2, lighting units 3 and renderer units 4. In this embodiment, it is the CPUs 1 that execute the microcode steps 0 though 4 described above to effect the real-time tessellation. Note, that the CPUs 1 also execute Step 0, the transformation of the control points.

Referring again to U.S. Pat. No. 6,563,501, we use the described subdivision algorithm while applying our termination criterion. The geometric adaptive subdivision induces a corresponding parametric subdivision.

L1=P1

L2=(P1+P2)/2

H=(P2+P3)/2

L3=(L2+H)/2

R4=P4

R3=(P3+P4)/2

R2=(R3+H)/2

R1=L4=(L3+R2)/2

The geometry vectors of the resulting left and right cubic curves may be expressed as follows:

$$GL = \begin{vmatrix} L1 \\ L2 \\ L3 \\ L4 \end{vmatrix} = 1/8 * \begin{vmatrix} 8000 \\ 4400 \\ 2420 \\ 1331 \end{vmatrix} * \begin{vmatrix} P1 \\ P2 \\ P3 \\ P4 \end{vmatrix} = 1/8 * DL * G$$

$$\text{where } DL = \begin{vmatrix} 8000 \\ 4400 \\ 2420 \\ 1331 \end{vmatrix}$$

$$G = \begin{vmatrix} P1 \\ P2 \\ P3 \\ P4 \end{vmatrix}$$

$$GR = \begin{vmatrix} R1 \\ R2 \\ R3 \\ R4 \end{vmatrix} = 1/8 * \begin{vmatrix} 1331 \\ 0242 \\ 0044 \\ 0008 \end{vmatrix} * \begin{vmatrix} P1 \\ P2 \\ P3 \\ P4 \end{vmatrix} = 1/8 * DR * G$$

$$\text{where } DR = \begin{vmatrix} 0242 \\ 1331 \\ 0044 \\ 0008 \end{vmatrix}$$

The edge subdivision results into a subdivision of the parametric intervals s $\{s_0, s_1, \ldots s_i, \ldots s_m\}$ and t$\{t_0, t_1, \ldots t_j, \ldots t_n\}$. Only these two parametric subdivisions are stored for each surface since this is all the information needed to calculate the vertices, $$V_{i,j} = V(x(s_i,t_j), y(s_i,t_j), z(s_i,t_j)) \quad i=1,m,\ j=1,n$$

$x(s,t) = S*Mb*Px*Mb^t*T$ wherein $S=[s3\ s2\ s\ 1]$ $T=[t3\ t2\ t\ 1]^t$ The superscript t indicates transposition $$Mb = \begin{vmatrix} -1 & +3 & -3 & +1 \\ +3 & -6 & +3 & 0 \\ -3 & +3 & 0 & 0 \\ +1 & 0 & 0 & 0 \end{vmatrix} \quad Mb^t \text{ is transposed of matrix } Mb$$

$$Px = \begin{vmatrix} P11 & P12 & P13 & P14 \\ P21 & P22 & P23 & P24 \\ P31 & P32 & P33 & P34 \\ P41 & P42 & P43 & P44 \end{vmatrix}_x$$

$$y(s,t) = S * Mb * Py * Mb^t * T$$

where $$Py = \begin{vmatrix} P11 & P12 & P13 & P14 \\ P21 & P22 & P23 & P24 \\ P31 & P32 & P33 & P34 \\ P41 & P42 & P43 & P44 \end{vmatrix}_y$$

$$z(s,t) = S * Mb * Pz * Mb^t * T$$

For s=constant the matrix $M=S*Mb*Pz*Mb^t$ is constant and the calculation of the vertices $V(x(s,t),y(s,t),z(s,t))$ reduces to the evaluation of the vector T and of the product M*T. Therefore, the generation of vertices is comparable with vertex transformation. Note that the vertices are generated already transformed in place because the parent bicubic surface has already been transformed.

In order to determine the vertex normals for each generated vertex $V_{i,j}$ we calculate the cross product between the edge entering the vertex and the edge exiting it and we make sure that we pick the sense that makes an acute angle with the normal to the surface:

$$N_{i,j}=P_{i-1,j}P_{i,j}\times P_{i,j}P_{i,j+1}/\text{length}(P_{i-1,j}P_{i,j}\times P_{i,j}P_{i,j+1})$$

If bump mapping or displacement mapping are enabled we need to calculate additional data:

$N'_{i,j}=N_{i,j}+dN_{i,j}$/*displace the normal for bump mapping, pixel by pixel in the renderer section */

$P'_{i,j}=P_{i,j}+(dx_{i,j}, dy_{i,j}, dz_{i,j})*N_{i,j}$/*displace the point P for displacement mapping, pixel by pixel */

Figure 7:
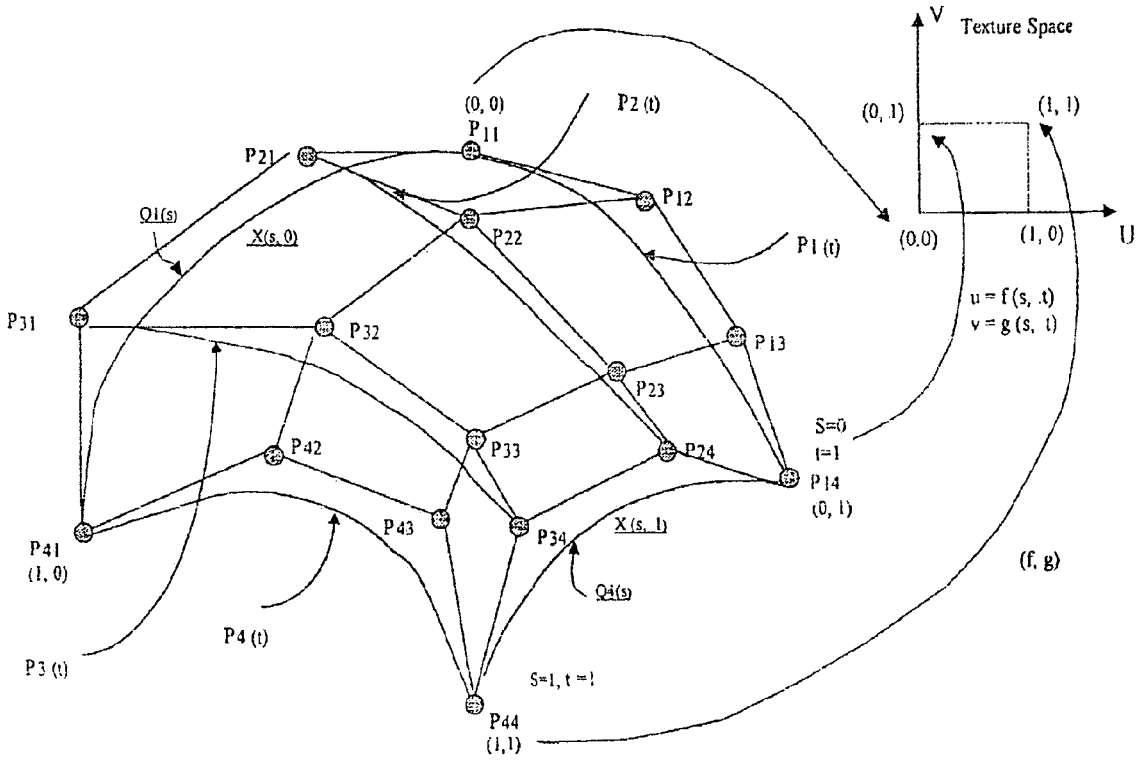
FIG. 7 describes the texture mapping process.

We calculate the texture coordinates through bilinear interpolation, as shown in FIG. 7. The parameterization of the surface produces a natural interpolation of the texture coordinates, see FIG. 7 for details. In our algorithm we calculate the texture coordinates corresponding to the new vertices every time a surface is retesselated while bump and displacement mapping are executed on a pixel by pixel basis in the renderer as in the conventional architectures. There is no attempt to execute bump or displacement mapping on a per triangle vertex basis because this approach would result into a varying level of detail with each tesselation.

The subdivision algorithm described in U.S. Pat. No. 6,563,501 applied to non rational surfaces. In a further embodiment of the present invention, the algorithm is extended to another class of surfaces, non uniform rational B-spline surfaces, or NURBS. Nurbs are a very important form of modeling 3-D objects in computer graphics. A non-uniform rational B-spline surface of degree (p, q) is defined by $$S(s,t)=[\Sigma^m_{i=1}\Sigma^n_{j=1}N_{i,p}(s)N_{j,q}(t)w_{i,j}P_{i,j}]/\Sigma^m_{i=1}\Sigma^n_{j=1}N_{i,p}(s)N_{j,q}(t)w_{i,j}$$

Such a surface lies within a convex hull formed by its control points. To fix the idea, let's pick m=n=4. There are 16 control points, P11 through P44 (similar to the Bezier surfaces). The surface lies within the convex hull formed by P11 thru P44.

Now consider any one of the curves:

$$C(s)=[\Sigma^m_{i=1}N_{i,p}(s)w_{i,j}P_i]/\Sigma^m_{i=1}N_{i,p}(s)w_i$$

where p is the order, $N_{i,p}(s)$ are the B-spline basis functions, $P_i$ are control points, and with the weight of is the last ordinate of the homogeneous point. The curve lies within the convex hull formed by the control points.

Such a curve can be obtained by fixing one of the two parameters s or t in the surface description. For example s=variable, t=0 produces such a curve. Like in the case of Bezier surfaces, there are 8 such curves, 4 boundary ones and 4 internal ones.

The subdivision of the surface reduces to the subdivision of the convex hull of the boundary curves or of the internal curves as described in the case of the Bezier surfaces.

Figure 9:
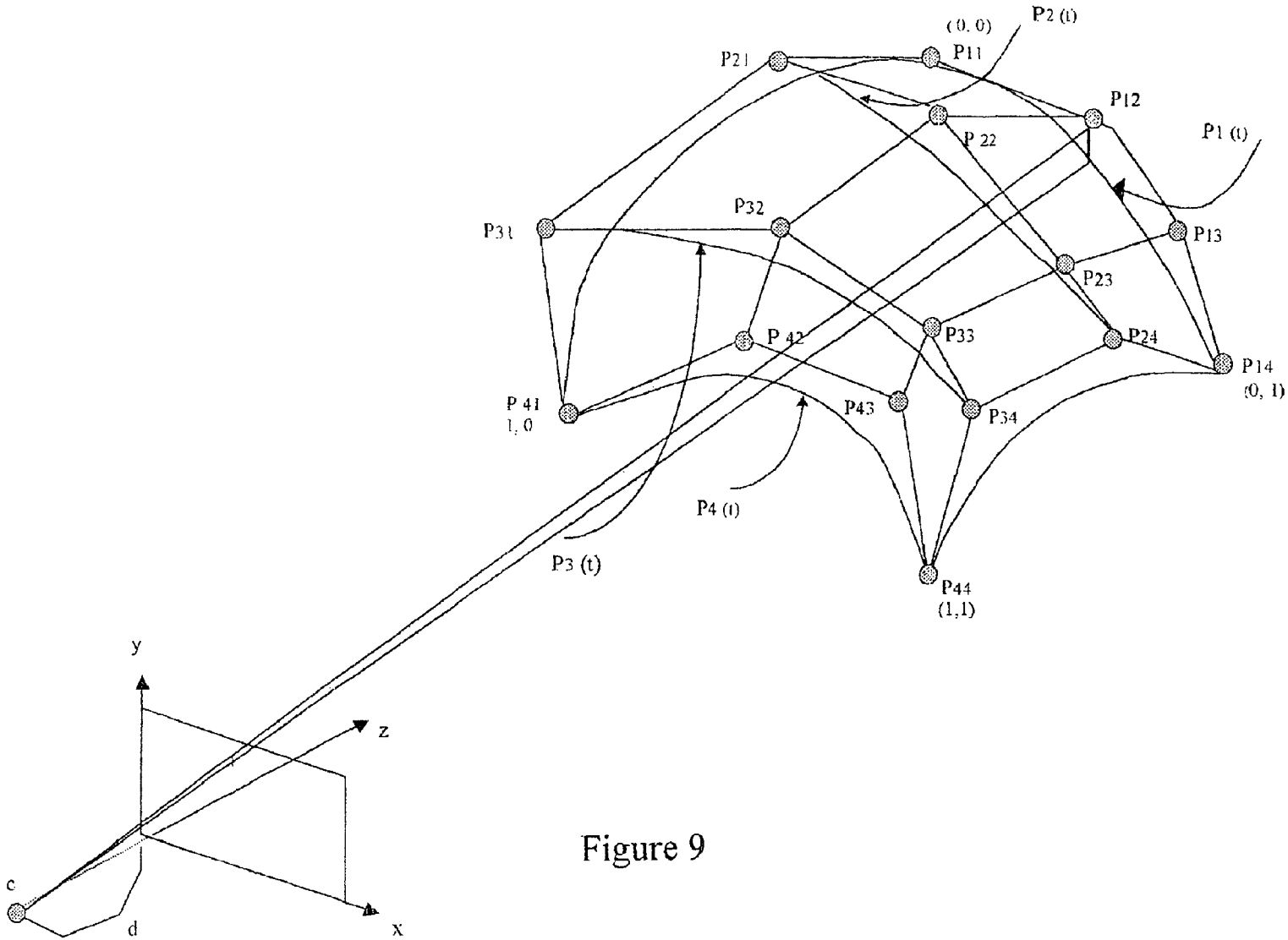
FIG. 9 shows how to calculate one criterion for terminating the subdivision.

Referring to FIG. 9, the subdivision termination criterion is shown, as described in U.S. Pat. No. 6,563,501:

Maximum {distance (P12 to line (P11, P14), distance (P13 to line (P11, P14)}*2d/(P12z+P13z)<n

AND

Maximum {distance (P24 to line (P14, P44), distance (P34 to line (P14, P44)}*2d/(P24z+P34z)<n where n is a number expressed in pixels or fraction of pixels. However, artifacts may be produced with n starting at 1, especially along a silhouette. Starting values for n may also include 0.5 and n>1, for reasons of rapid prototyping and previewing.

According to a further aspect of the present invention, a more general criterion is provided:

Maximum {distance (P22 to line (P42, P12), distance (P32 to line (P42, P12)}*2d/(P42z+P12z) AND Maximum {distance (P33 to line (P43, P13), distance (P23 to line (P43, P13)}*2d/(P43z+P13z)<n

AND

Maximum {distance (P22 to line (P21, P24), distance (P23 to line (P21, P24)}*2d/(P21z+P24z) AND Maximum {distance (P32 to line (P31, P34), distance (P33 to line (P31, P34)}*2d/(P31z+P34z)<n

AND

Maximum {distance (P12 to line (P11, P14), distance (P13 to line (P11, P14)}*2d/(P12z+P13z) AND Maximum {distance (P42 to line (P41, P44), distance (P43 to line (P41, P44)}*2d/(P42z+P43z)<n

AND

Maximum {distance (P24 to line (P14, P44), distance (P34 to line (P14, P44)}*2d/(P24z+P34z) AND Maximum {distance (P21 to line (P11, P41), distance (P31 to line (P11, P41)}*2d/(P11z+P41z)<n The above criterion is the most general criterion and it will work for any class of surface, both rational and non-rational. It will also workfordeformable surfaces. It will work for surfaces that are more curved along the boundary or more curved internally. Since the curvature of deformable surfaces can switch between being boundary-limited and internally-limited the flatness of both types of curves will need to be measured at the start of the tesselation associated with each instance of the surface. The pair of orthogonal curves used for tesselation can then be one of: both boundary, both internal, one boundary and one internal.

Yet another embodiment, the subdivision termination criteria may be used for the control of the numerically controlled machines. The criterion described below is calculated in object coordinates. In the formulas described below "tol" represents the tolerance, expressed in units of measurement (typically micrometers) accepted for the processing of the surfaces of the machined parts:

Maximum {distance (P22 to line (P42, P12), distance (P32 to line (P42, P12)} AND Maximum {distance (P33 to line (P43, P13), distance (P23 to line (P43, P13)}<tol

AND

Maximum {distance (P22 to line (P21, P24), distance (P23 to line (P21, P24)} AND Maximum {distance (P32 to line (P31, P34), distance (P33 to line (P31, P34)}<tol

AND

Maximum {distance (P12 to line (P11, P14), distance (P13 to line (P11, P14)} AND Maximum {distance (P42 to line (P41, P44), distance (P43 to line (P41, P44)}<tol

AND

Maximum {distance (P24 to line (P14, P44), distance (P34 to line (P14, P44)} AND Maximum {distance (P21 to line (P11, P41), distance (P31 to line (P11, P41)}<tol If there are no special prevention methods, cracks may appear at the boundary between abutting patches. This is mainly due to the fact that the patches are subdivided independently of each other. Abutting patches may and do exhibit different curvatures resulting into different subdivisions. For example, in FIG. 10 we see that the right-hand patch has a finer subdivision than the left-hand one. At the boundary we see how a "T-joint" has been formed. When rendering the parallel strips of triangles to the left and to the right of the common boundary a crack may become visible in the area of the T-joint.

One of the approaches disclosed herein exhibits identical straight edges for the two patches sharing the boundary. The other implementation exhibits even stronger continuity; the subpatches generated through subdivision form continuous strips orthogonal to the shared boundary. This is due to the fact that abutting patches are forced to have the same parametric subdivision. The present invention provides two different crack prevention methods, each employing a slightly different subdivision algorithm.

Figure 10:
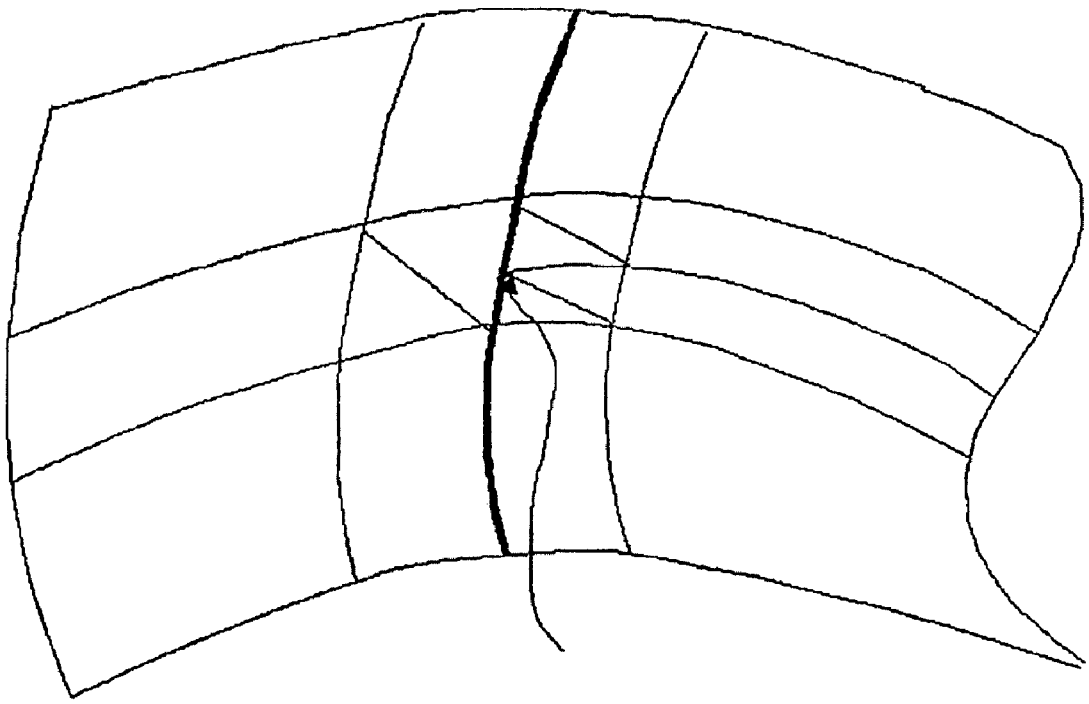
FIG. 10 shows how cracks can appear at the T-joints on the boundary curves between surfaces.
Figure 11:
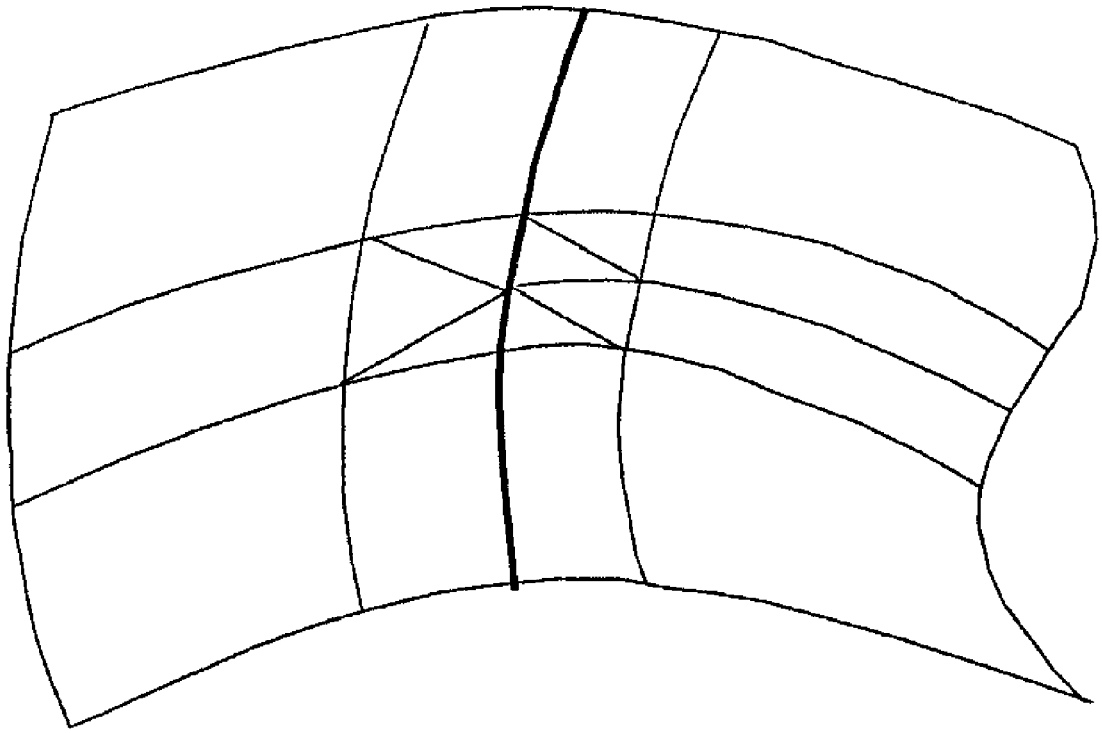
FIG. 11 shows how to "zipper" the cracks at the T-joints.

1. In order to avoid cracks between patches use a "zipper approach" to fix the triangle strips that result at the four borders of the surface. All four boundary curves for the patches situated at the edge of the object are used. See FIG. 11 for a rendering of the "zipper" approach. Note that adjacent patches have different parametric subdivisions resulting into different triangle meshes. In this embodiment each patch is subdivided independently. All the subdivisions for all the edges of all the patches are stored. Due to this approach, a common boundary curve between two patches may be subdivided differently inside each of the abutting patches that form the respective boundary. Where two patches abut along a common boundary curve, the strips of triangles on the two sides of the common boundary are compared: if there are triangle vertices belonging to a first strip that are not exactly coincident with the vertices of the second strip, the non-coincident vertices from the first triangle strip are copied into the second strip resulting in a strip with more triangles. FIG. 10 shows how the triangle strip on the right side of the boundary curve produces a vertex (a "T-joint") inside the edge of a triangle belonging to the strip on the left of the boundary. In FIG. 11, the "T-joint" has been removed by connecting two edges that emerge from the vertex that originated the "T-joint".

Figure 12:
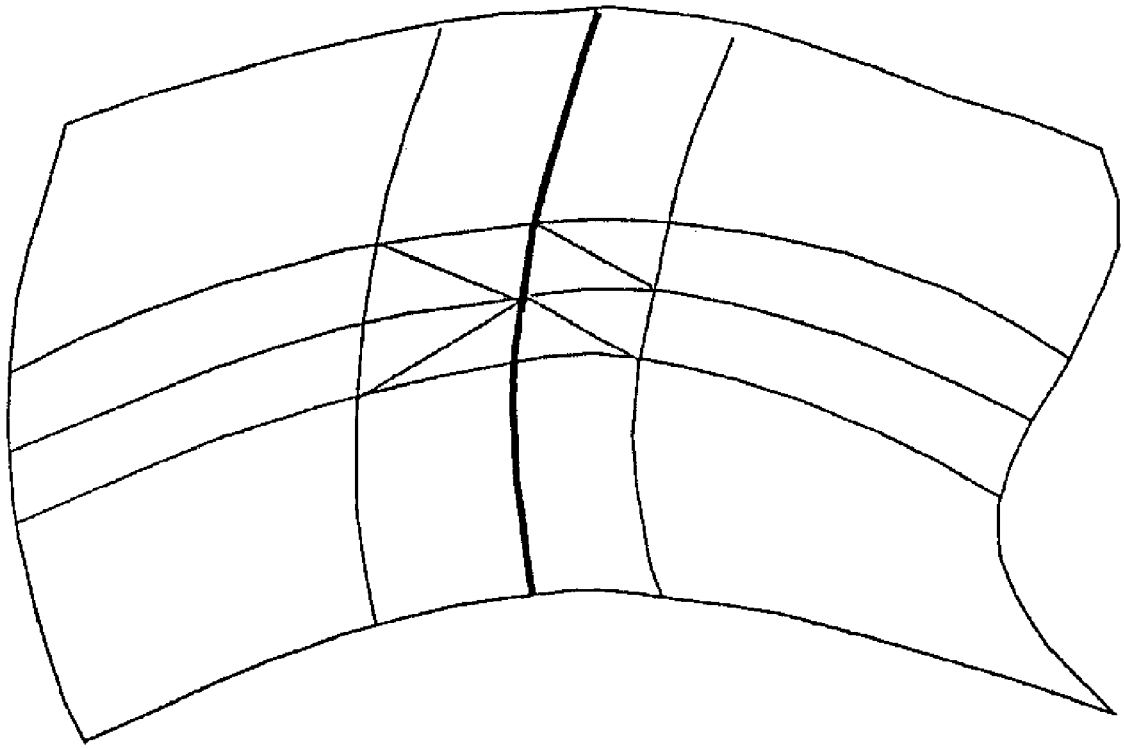
FIG. 12 shows how using the same subdivision for neighboring surfaces completely avoids the cracks.

2. In order to avoid cracks between patches, use a second pass that generates the reunion of the subdivisions for all the patches in a patch strip. All four boundary curves for the patches situated at the edge of the object are used. See FIG. 12 for a rendering of this approach. Note that in this case surfaces that share, for example, as parametric boundary, will share the same subdivision in s throughout the surface. The tessellation is deferred until after the subdivisions are generated. Once the subdivisions have been generated all the patches can be tessellated and rendered independent of each other. This makes this approach extremely attractive for parallel processing.

In a preferred embodiment, in order to facilitate the design of drivers for the architecture shown in FIG. 3, the present invention provides a Graphics Utility Library (GLU). The GLU includes several different types of primitives including, strips, fans, meshes, and indexed meshes of surface patches.

Below, the first three primitives are described. Referring to FIG. 13, in a strip, the first patch contributes 16 vertices, each subsequent patch contributes only 12 because 4 are shared with the previous patch. Of the 16 vertices of the first patch, S1, only 4, the corners P11, P14, P41, P44 have color and texture attributes, the remaining 12 have only geometry attributes. Of the 12 vertices of each subsequent patch, Si, in the strip only one, P44 has color and texture attributes. This fact explains the reduction of the memory footprint and of the bus bandwidth necessary for transmitting the primitive from the CPU to the GPU over the AGP bus. The compression is further increased by the fact that a patch will be expanded into potentially many triangles by the tessellator unit inside the GPU. Each patch has an outward pointing normal.

Referring to FIG. 14, each patch has only 3 boundary curves, the fourth boundary having collapsed to the center of the fan. The first patch in the strip enumeration has 11 vertices, each subsequent patch having 8. Vertex P11, listed first in the fan definition, is the center of the fan and has color and texture attributes in addition to geometric ones. The first patch, S1, has two vertices with color and texture attributes, P41 and P44; the remaining 9 have only geometric attributes. Each subsequent patch, Si, has only one vertex with all the attributes.

Referring to FIG. 15, in a mesh, the anchor patch, S11 has 16 vertices, all the patches in the horizontal and vertical strips attached to S11 have 12 and all the other patches have 9.

A further embodiment of the present invention provides a method for accelerating rendering. A well known technique used for accelerating rendering is backface culling, which a method which discards triangles that are facing away from the viewer. It is beneficial to extend this technique to cover backfacing surfaces. This way, we avoid the computational costs of tesselating surfaces that face away from the user. Our proposed method discards such surfaces as a whole, before even starting the tesselation computation.

Referring to FIG. 9, observe that the convex hull is made up of 13 planar side panels ({P41,P44,P43,P42}, {P44,P34,P33, P43}, . . . {P33,P23,P22,P32}) and one bottom panel ({P44, P41,P11,P14}) that may not be planar in most cases. The order of listing the vertices in each of the 14 panels coincides with the outwards pointing normal. If any of the 13 side panels is front facing than the surface may be (at least partially) front facing. Therefore, the criterion for culling the patch as backfacing is:

If ANY of the panels of the type {P41, P44, P43, P42} is front facing then the patch should not be culled.

An alternative criterion can be given as:

If the bottom panel {P44, P41, P11, P14} is backfacing then the patch should not be culled. This criterion means that since the bottom panel {P44, P41, P11, P14} is backfacing, there may be other panels in the convex hull that may be front facing. This being the case, the patch should not be considered as being backfacing and should not be culled.

A method and system has been disclosed for performing tessellation in real-time in a GPU. Software written according to the present invention is to be stored in some form of computer-readable medium, such as memory or CD-ROM, or transmitted over a network, and executed by a processor. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system, comprising:

a processor; and a graphics processing unit (GPU) coupled to the processor, the GPU comprising a transform unit, a lighting unit, a renderer unit, and a tessellate unit coupled between the transform unit and the lighting unit;

wherein objects to be rendered by the GPU are transmitted as control points to the GPU, the transform unit transforms the control points, the tessellate unit executes a first set of instructions for tessellating both rational and non-rational object surfaces expressed in screen coordinates (SC), in real-time, the lighting unit lights vertices of the triangles resultant from tessellation, and the renderer unit renders and displays the triangles by executing a second set of instructions.

2. The graphics system of claim 1 wherein the first set of instructions simplifies three dimensional surface subdivision of the object surfaces by reducing surface subdivision to a subdivision of two cubic curves by performing instructions for:

for each bicubic surface, subdividing a boundary curve representing an s interval until a projection of a length of a height of a curve bounding box is below a certain predetermined number of pixels as measured in screen coordinates; and subdividing the boundary curve representing a t interval until a projection of a length of a height of the curve bounding box is below a certain predetermined number of pixels as measured in screen coordinates.

3. The graphics system of claim 2 wherein the first set of instructions simplifies three dimensional surface subdivision by reducing it to the subdivision of two cubic curves by simplifying subdivision termination criteria by expressing the termination criteria in screen (SC) coordinates and by measuring curvature in pixels, wherein for each new view, a new subdivision can be generated, producing automatic level of detail.

4. The graphics system of claim 3 wherein the first set of instructions reduces cracks at the boundaries between surfaces by using a common subdivision for all surfaces sharing a boundary by performing instructions for:

for all bicubic surfaces sharing a same s or t parameter boundary, choosing as a common subdivision a reunion of the subdivisions in order to prevent cracks showing along the common boundary or a finest subdivision, the finest subdivision being the one with the most points inside the set.

5. The graphics system of claim 4 wherein the first set of instructions generates vertices, normals, texture coordinates, and displacements used for bump and displacement mapping are generated by performing instructions for:

for each bicubic surface, for each pair (si,tj) of parameters, where i and j represent a number of rows and columns, respectively, calculating texture coordinates (($u_{i,j}$ $v_{i,j}$ $q_{i,j}$) and displacement coordinates ($p_{i,j}$ $r_{i,j}$) for vertex $V_{i,j}$) thru interpolation, looking up vertex displacement ($dx_{i,j}$, $dy_{i,j}$, $dz_{i,j}$) corresponding to the displacement coordinates ($p_{i,j}$ $r_{i,j}$); and generating triangles by connecting neighboring vertices.

6. The graphics system of claim 5 wherein the second set of instructions generates vertices, normals, texture coordinates, and displacements used for bump and displacement mapping by performing instructions for:

for each vertex $V_{i,j}$, calculating a normal $N_{i,j}$ to that vertex, which was previously transformed in world coordinates calculating ($dN_{i,j}$) as normal displacement for bump mapping as a function of (si,tj)

calculating $N'_{i,j}=N_{i,j}+dN_{i,j}$ to displace the normal for bump mapping; and calculating $V'_{i,j}=V_{i,j}+(dx_{i,j}, dy_{i,j}, dz_{i,j})*N_{i,j}$ to displace the vertiex for displacement mapping;

for each triangle, executing bump and displacement mapping pixel-by-pixel for all the points inside the triangle; and calculating a normal to the triangle for culling.

7. The graphics system of claim 1 further including a Graphics Utility Library (GLU) for implementing drivers.

8. The graphics system of claim 1 wherein the GLU includes several different types of primitives including, strips, fans, meshes, and indexed meshes of surface patches.

9. A real-time method for tessellating and rendering surfaces of an object on a computer system, comprising:

(a) performing transformation and tessellation by, (i) for each surface, transforming 16 points;

(ii) performing three dimensional surface subdivision using the computer system by subdividing only two cubic curves comprising the surface;

(iii) terminating the subdivision termination by expressing the subdivision in screen coordinates (SC) and by measuring curvature in pixels;

(iv) for each new view, generating a new subdivision, thereby producing automatic level of detail;

(v) preventing cracks at boundaries between adjacent surfaces by using a common subdivision for all surfaces sharing a boundary;

(vi) for the current subdivision, generating the vertices, normals, texture coordinates, and displacements used for bump and displacement mapping; and (vii) generating triangles by connecting neighboring vertices;

(viii) for each vertex, calculating the normal, calculating normal displacement for bump mapping, displacing the normal for bump mapping, displacing the vertex for displacement mapping, wherein bump and displacement mapping are executed pixel by pixel for all the points inside each triangle; and (ix) calculating the normal of each triangle; and (b) performing rendering by (i) for each triangle, clipping against a viewing viewport, calculating lighting for additional vertices produced by clipping, and culling backfacing triangles;

(ii) projecting all vertices into screen coordinates; and (iii) rendering all the triangles produced after clipping and projection.

*10. A system comprising:*

*a central processing unit;*

*a bus operatively connected to said central processing unit; and*

*a graphics processing unit operatively connected to said bus;*

*wherein the central processing unit transmits graphic objects to said graphics processing unit via said bus; and*

*wherein said graphics processing unit comprises a transform unit that transforms the graphic objects into transformed objects;*

*a tessellation unit for tessellating the transformed objects, wherein said tessellation unit is operatively coupled between said transform unit and a lighting unit; and*

*said lighting unit comprising means for lighting triangles resulting from said tessellation unit.*

*11. The system of claim 10 wherein the tessellation unit tessellates the transformed objects into a plurality of triangle vertices.*

*12. The system of claim 10 wherein the graphic objects have spatial coordinates and said transform unit transforms the spatial coordinates of said graphic objects.*

*13. The system of claim 10 further comprising a lighting unit operatively coupled to the tessellation unit for lighting the tessellated transformed objects.*

*14. The system of claim 13 further comprising a rendering unit operatively coupled to the lighting unit for rendering the lighted, tessellated, transformed objects.*

*15. A method comprising:*

*providing a tessellation unit coupled between a transform unit and a lighting unit;*

*receiving graphic objects to be rendered by a graphics processing unit;*

*transforming the graphic objects into transformed objects using said transform unit;*

*tessellating the transformed objects using said tessellation unit; and*

*lighting vertices of triangles resultant from said tessellating using said lighting unit.*

*16. The method of claim 15 wherein the graphic objects comprise control points of a bicubic surface.*

*17. The method of claim 16 wherein the control points comprise spatial coordinates and the transformation step comprises transforming the coordinates of the control points.*

*18. The method of claim 16 wherein the tessellation step comprises subdividing the surface into a number of triangles.*

*19. The method of claim 18 wherein the tessellation step further comprises terminating the subdivision when the curvature of a triangle is less than a predetermined amount.*

*20. The method of claim 19 wherein the degree of subdivision at meeting edges of two bicubic surfaces is equal.*

* * * * *